United States Patent [19]
Gaylord

[11] 3,766,611
[45] Oct. 23, 1973

[54] LOCKING LEVER RELEASE FOR STRAP CONNECTOR

[75] Inventor: John A. Gaylord, Greenbrae, Canada

[73] Assignee: H. Koch & Sons, Inc., a division of Global Systems, Marin County, Calif.

[22] Filed: Mar. 15, 1972

[21] Appl. No.: 234,735

[52] U.S. Cl............ 24/230 A, 244/151 A, 294/83 A
[51] Int. Cl.............................................. A44b 19/00
[58] Field of Search ..................... 294/83 A, 83 AB, 294/83 AA, 83 AE; 24/241 SB, 201 D, 230 A, 230 AP, 230 AT, 230 AV; 244/151 A

[56] References Cited
UNITED STATES PATENTS
3,183,568  5/1965  Gaylord ............................ 24/230 A
3,624,674  11/1971  Gaylord ......................... 24/230 AV Primary Examiner—Donald A. Griffin
Attorney—George B. White

[57] ABSTRACT

On strap connectors wherein the prongs of a male member are inserted into pockets of the female member and are held in place by a rocking shaft in notches in the prongs, which rocking shaft is cut away so that it can be turned out of said notches into an out of the way position for releasing the prongs, and wherein a manipulating lever is provided for rocking said shaft into and out of the notches of said prongs, and wherein also gas pressure actuated means are provided for rocking the shaft into prong releasing position, and wherein a locking lever is provided to prevent the manipulation of said manipulating lever, a gas actuated plunger having a projection bearing against said locking lever and actuated simultaneously with the gas actuated rocking of said shaft, for pushing the locking lever into releasing position.

3 Claims, 3 Drawing Figures

LOCKING LEVER RELEASE FOR STRAP CONNECTOR

BACKGROUND OF THE INVENTION

In the type of canopy release or buckle release shown in U.S. Pat. No. 3,183,568 issued on May 18, 1965, or U.S. Pat. No. 3,541,650 issued Nov. 24, 1970, a locking lever is provided to lock the manipulating yoke lever to prevent the rocking of the rocking shaft into male prong releasing position. In order to make certain that the locking lever releases the manipulating lever so as to permit the rocking of the rocking shaft by gas pressure operated means, the primary feature of the herein invention is the provision of an auxiliary gas pressure operated means for pushing the locking lever into releasing position whenever pressure medium is conveyed to the gas pressure actuated shaft rocking means.

DETAILED DESCRIPTION

Figure 1:
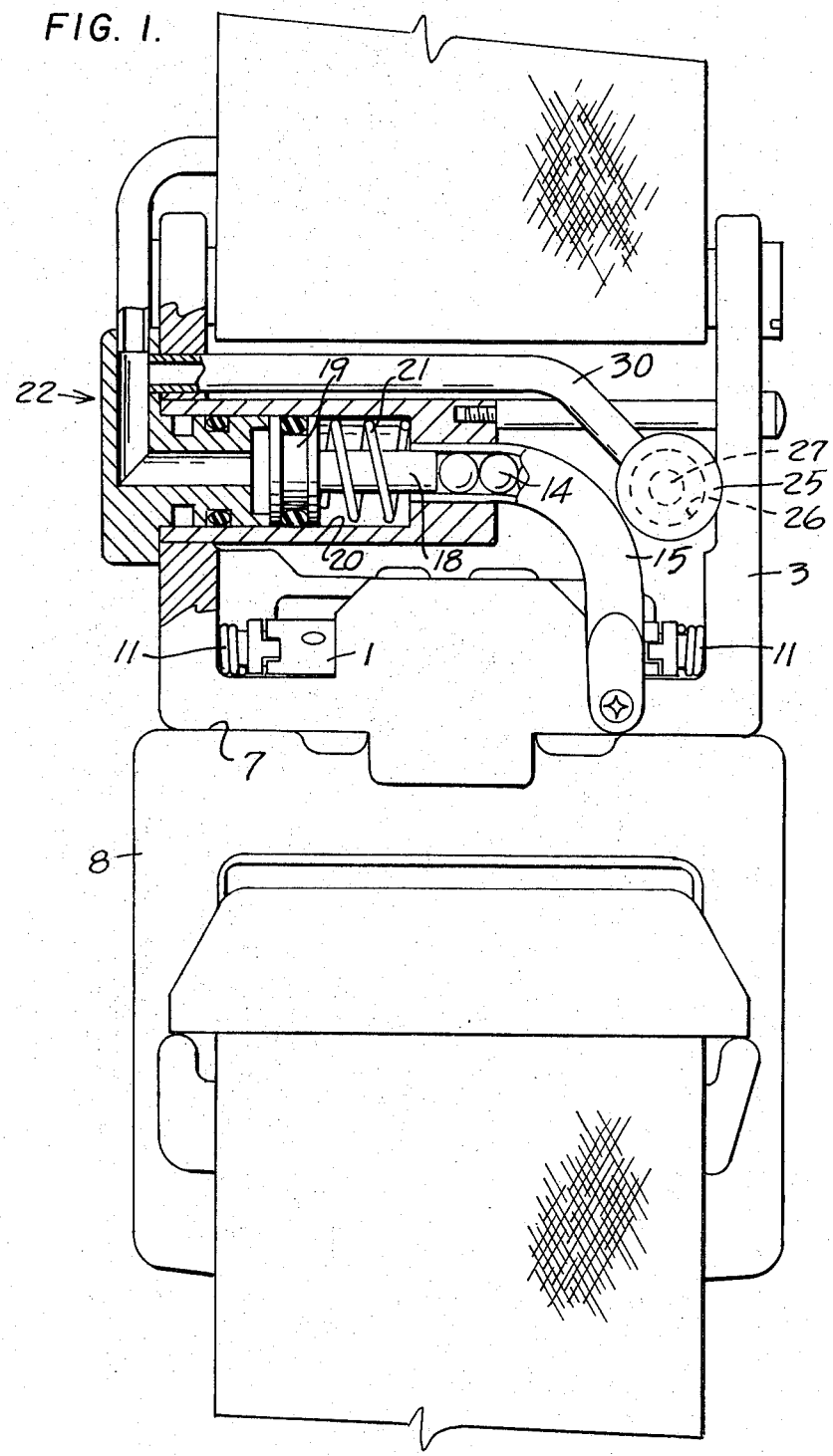
FIG. 1 is a partly sectional front view of the strap connector.
Figure 2:
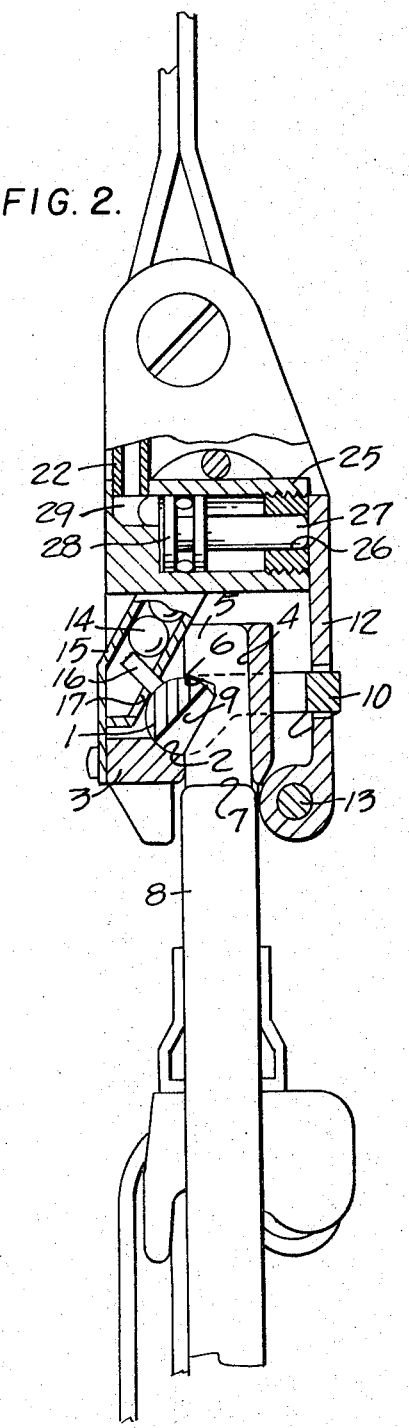
FIG. 2 is a cross-sectional view showing the parts in connected position.
Figure 3:
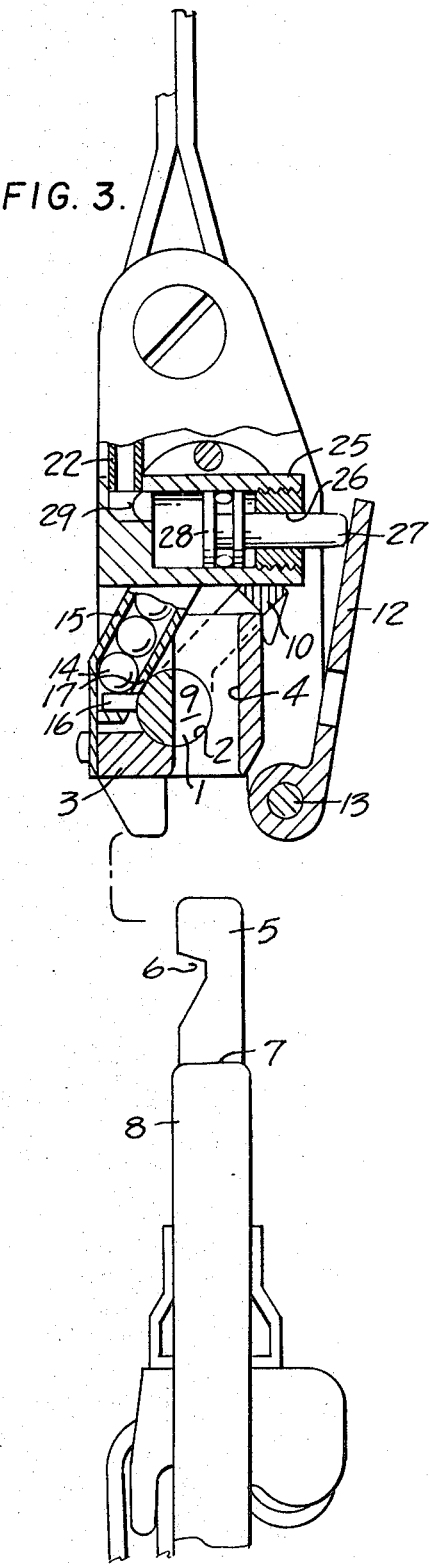
FIG. 3 is a partly cross-sectional view showing parts in released position.

The essential elements of a female member of a strap connector include a rocking shaft 1 rockable in a transverse hole 2 in the body 3 of the female member so that the journal hole 2 intersects pockets 4 for male prongs 5 inserted at right angles to the journal hole 2. The male prongs 5 have notches 6 which are located in registry with the rocking shaft 1 when the shoulder 7 of the male strap connector 8 abuts the female body 3. The rocking shaft 1 has diametric recesses 9 in registry with the pockets 4 so that when the rocking shaft 1 is rocked in the journal 2 from an initial position to a releasing position, the rocking shaft is withdrawn from the notches 6 so that the recessed portions 9 permit the withdrawal of the male prongs 5.

A manipulating lever 10 is in the form of a yoke as described in said patents, engaging the ends of the rocking shaft 1 for rocking said shaft 1, which yoke lever 10 is normally urged by springs 11 into locking position. A locking lever 12 pivoted on a pivot pin 13 in the body 3 is also spring biased toward the body 3 and extends over the manipulating yoke lever 10 to prevent the manipulation or movement of the latter.

Gas pressure actuated releasing device is provided for rocking the rocking shaft 1 into prong releasing position. In the present illustration the gas pressure actuated releasing device includes a plurality of balls 14 bearing upon one another in a tube 15 and against a finger 16 extended from the rocking shaft 1 through an elongated slot 17 in the adjacent portion of the tube 15. A plunger stem 18 is reciprocable in the upper end of the tube 15 and it has a plunger 19 on its end farthest from the balls 14, which plunger 19 reciprocates in a cylinder 20 and is normally urged by a coil spring 21 away from the tube 15. A suitable gas intake 22 connected to a supply of pressure medium admits such pressure medium to push the plunger 19 toward the tube, thereby to push the plunger stem 18 against the balls 14, which in turn exert pressure on the finger 16 for rocking the shaft 1 into prong releasing position.

The auxiliary releasing mechanism includes a cylinder 25 in the body 3 above the rocking shaft 1. An end of the cylinder 25 is adjacent to the locking lever 12 and it has a hole 26 through which extends a stem 27 to bear against the adjacent portion of the locking lever 12. On the inner end of the stem 27 is a suitable plunger 28 which works in the cylinder. At the end of the cylinder 25 adjacent the plunger 28 is an inlet 29 connected by a tube 30 to the principal intake 22.

Whenever a pressure medium, such as gas under pressure, is introduced to the intake 22 for rocking the shaft 1, gas also rushes through the auxiliary tube 30 and pushes the auxiliary plunger 28 so as to push the auxiliary stem 27 out through the hole 26 against the locking lever 12 thereby to push the locking lever 12 out of engagement from the manipulating yoke lever 10 and thereby free the same to permit the rocking of the rocking shaft 1 by the gas pressure actuated means.

I claim:

1. In a strap connector having a female member with a transverse hole in which a rocking shaft is rockable into and out of releasing position relatively to male prongs of a male member inserted into said female member so as to intersect said hole, said rocking shaft being adapted to release said prongs when rocked from an initial locking position into a releasing position, and having a manipulating lever for manually rocking said rocking shaft and having a locking lever to lock said manipulating lever in prong locking position, a device actuated by a pressure medium for rocking said shaft into releasing position, and means to conduct said pressure medium to said device, the improvement of an anxiliary pressure actuated device for moving said locking lever into releasing position comprising, an element in said female body related to said locking lever and being movable to shift said locking lever from locking position into releasing position, and means actuated by the same pressure medium which actuates said pressure actuated shaft rocking means to move said movable member for shifting said locking member into releasing position substantially simultaneously with the pressure actuated rocking of said rocking shaft into prong releasing position.

2. The device specified in claim 1, and said movable member being a reciprocating element, and said gas actuated auxiliary means being a plunger to reciprocate said movable element.

3. The device specified in claim 1, and said movable member being a plunger stem bearing against said locking lever in locking position, said auxiliary pressure medium actuated device including a plunger on said stem reciprocable in a cylinder chamber in said female member, an intake in the end of said cylindrical chamber adjacent said plunger, and means to connect said intake with the pressure medium supply to said pressure medium actuated shaft rocking device.

* * * * *